(12) United States Patent
Leas

(10) Patent No.: US 6,397,014 B1
(45) Date of Patent: May 28, 2002

(54) OPTICAL DEVICE FOR INDICATING THE POSITION OF A FLEXIBLE WEB

(75) Inventor: Peter J. Leas, Penfield, NY (US)

(73) Assignee: Heidelberg Digital L.L.C., Rochester, NY (US)

( * ) Notice: Subject to any disclaimer, the term of this patent is extended or adjusted under 35 U.S.C. 154(b) by 0 days.

(21) Appl. No.: 09/585,524

(22) Filed: Jun. 1, 2000

(51) Int. Cl.[7] .............................................. G03G 15/00
(52) U.S. Cl. ............................................. 399/11; 399/9
(58) Field of Search ................................. 399/9, 11, 26, 399/31, 48, 126, 13, 301; 73/1.79, 1.81; 702/150, 153, 154, 158, 159; 347/116; 356/138, 154

(56) References Cited

U.S. PATENT DOCUMENTS

| | | | |
|---|---|---|---|
| 4,560,274 A | * | 12/1985 | McNeely .................... 356/154 |
| 4,735,508 A | * | 4/1988 | Bellio |
| 4,914,477 A | * | 4/1990 | Young et al. ............. 399/11 X |
| 5,067,817 A | * | 11/1991 | Glenn |
| 5,111,056 A | * | 5/1992 | Yoshimura et al. |
| 5,276,497 A | * | 1/1994 | Oono ..................... 356/154 X |
| 5,543,918 A | * | 8/1996 | Abraham et al. |
| 5,914,785 A | * | 6/1999 | Allison et al. .............. 356/375 |
| 6,054,717 A | * | 4/2000 | Perchak ................... 356/138 X |
| 6,166,749 A | * | 12/2000 | Lee .................................. 347/116 |
| 6,179,938 B1 | * | 1/2001 | Mannhart et al. ....... 702/153 X |

* cited by examiner

*Primary Examiner*—Sandra Brase

(57) ABSTRACT

An optical device for indicating the position of a flexible web in a machine. The device is mounted in a fixed bracket and a collimated beam is reflected from the web onto a screen to produce a visible light spot. The location of the light spot on the screen is directly related to the position of the web.

18 Claims, 6 Drawing Sheets

OPTICAL DEVICE FOR INDICATING THE POSITION OF A FLEXIBLE WEB

FIELD OF THE INVENTION

This invention relates in general to a non-contact distance measuring device, and more particularly to an apparatus for indicating the position of a flexible web which may be otherwise disturbed by a contact measuring device.

BACKGROUND OF THE INVENTION

The standard methods used to measure distance between two solid surfaces may not be applicable when one of the surfaces is not rigid, as in the case of a film belt. In the current art, a contact method is used, wherein a measuring device contacts the belt as disclosed for example in U.S. Pat. No. 5,956,544. However, the contact method may cause the belt to be deflected, thereby introducing an error in the measurement.

In addition, contact may damage sensitive surfaces. For example, prior methods used to determine the distance between an electrometer probe and the film belt in a copier, or printer, is by physical contact with both surfaces. This is done with a setup film, which is then replaced before the unit is shipped. When an optical based system, such as a laser, is used, the energy of a reflected beam is currently used to calculate the distance. Any changes in the target surface, such as dirt or scratches, will affect the amount of energy reflected, therefore resulting in an inaccurate measurement. Therefore, a non-contact method is required which is not susceptible to errors resulting from the loss of reflected energy.

SUMMARY OF THE INVENTION

The present invention provides a non-contacting apparatus for determining the distance between a reference point and a target surface, wherein a collimated beam such as a laser beam is reflected off the target surface and viewed on an imaging member such as a viewing window or screen. A source of the collimated beam and a screen are contained in a single housing. The projection angle of the beam and the location of the screen can be preset for the desired distance between the surfaces. The location of the reflected beam relative to markings on the screen indicate whether the distance is within specifications. Using a combination of both horizontal and vertical lines on the screen allows confirmation of both the distance and angular alignment of the target to the reference point. Mirrors may also be used to configure a beam path for the system. As the location of the reflected beam on the screen is used to determine the distance rather than the amount of reflected energy, changes in the surface of the target do not affect the accuracy of the system.

For example, this tool would be put in place of the electrometer probe in an electrophotographic marking engine such as a copier/printer, to aid in the set up or confirmation of the spacing between the probe and a film belt. A visible laser source, i.e. a laser diode, is employed to eliminate external connections for operation. This system can also be applied to other measurements where conventional methods are not practical. An example could be the spacing between the tones roller and photoconductor in a copier/printer, or the gap between the grid of a charger and the film belt. Alternative configurations of this tool would allow for manual adjustment of the beam source and/or mirrors to measure different distances.

The invention, and its objects and advantages, will become more apparent in the detailed description of preferred embodiments presented below.

DETAILED DESCRIPTION OF THE PREFERRED EMBODIMENTS

Figure 1:
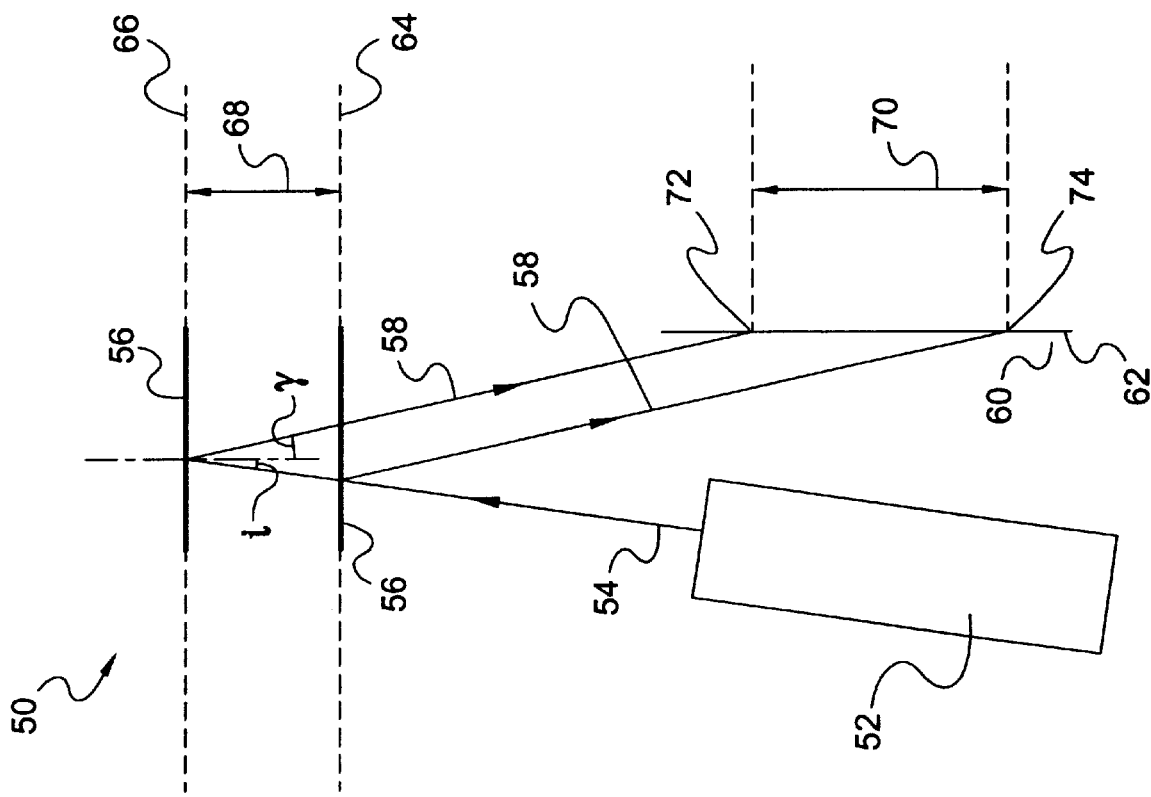
FIG. 1 is a schematic drawing of an optical system in a distance measuring device.

Referring now to the drawings of a distance measuring device 20, FIG. 1 schematically illustrates an optical system 50 by which the device 20 operates to determine a distance between a reference point and a target 56. A collimated energy source such as visible light source 52 projects a collimated beam 54 towards the target 56. The angle of incidence i of the projected beam 54 and the target 56 is greater than 0° but less than 90°. The target 56 on which the projected beam 54 impinges is at least partially reflective, so that a reflected beam 58 is directed towards an indicating member 60. The projected beam 54 and the reflected beam 58 are in the same vertical plane. As is well known, the angle of reflection r is equal to the angle of incidence i. The indicating member 60 can be any structure on which the reflected beam 58 can be viewed. It is most conveniently a screen 62 which may be fabricated from a material such as ground glass or translucent plastic which is capable of clearly registering the area where it is intersected by the beam 58.

FIG. 1 shows the system with the target 56 in alternative positions represented by a first plane 64 and a second plane 66, which are two within a range of parallel planes which the target 56 can occupy. The planes 64 and 66 are spaced apart by a distance represented by a double arrow 68. When the target 56 is in the plane 64, the reflected beam 58 impinges on the screen 62 at a first point 72. With the target 56 in the plane 66, the reflected beam 58 impinges on the screen at a second point 74. The points 72 and 74 are spaced apart by a distance represented by a second double arrow 70. It is easily shown that when the geometry of the system is constant except for the separation of the planes 64 and 66, the distance 70 is entirely dependent on the distance 68, and therefore provides a measure or indication of the position of the target 56. FIG. 1 is drawn assuming that the projected beam 54 originates at a point source; the projected beam 54 and reflected beam 58 would therefore have no finite width. In reality, their widths are finite, and any point such as 72 and 74 would appear on the screen 62 as a finite light spot 36.

Figure 2:
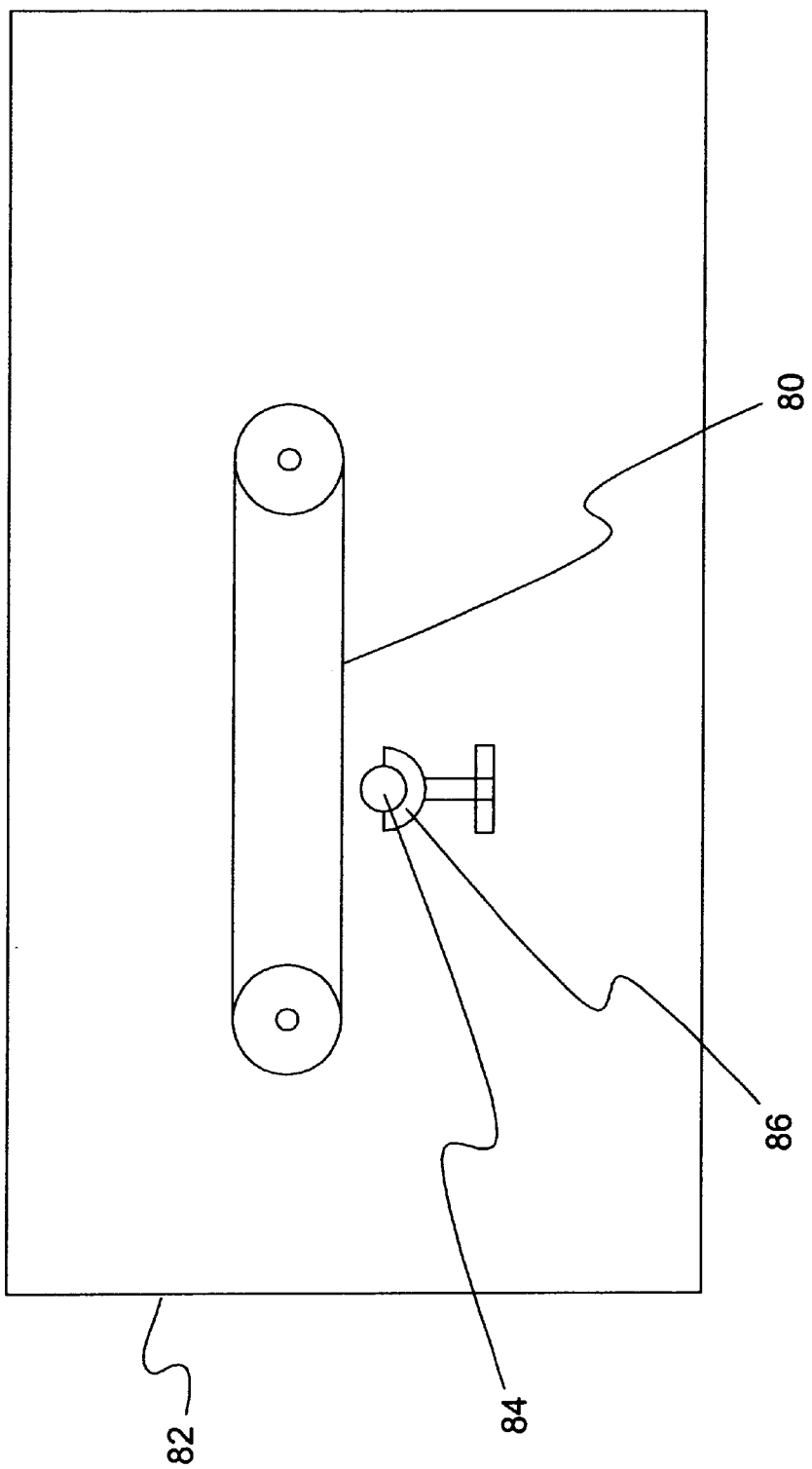
FIG. 2 is a schematic drawing of an electrophotographic marking machine showing a translatable web and an electrometer probe.

FIG. 2 is a schematic drawing of a continuous translatable web 80 in an electrophotographic marking machine 82. When the machine 82 is in an operable condition, an elongate electrometer probe 84 is proximate to the web 80. The probe 84 detects the electrostatic potential of the web 80. An accurate potential reading depends on a proper calibration of the relative to the distance by which the web 80 and the probe 84 are spaced apart. Once the calibration is established, it is important that this distance be held within certain limits. The separation of the adjustment of the web 80 and the probe 84 may be out of specification if, for instance, the web 80 itself degrades, or a replacement web is installed which does not exactly match its predecessor, or if the position of a bracket 86 which holds the probe 84 changes.

Figure 3:
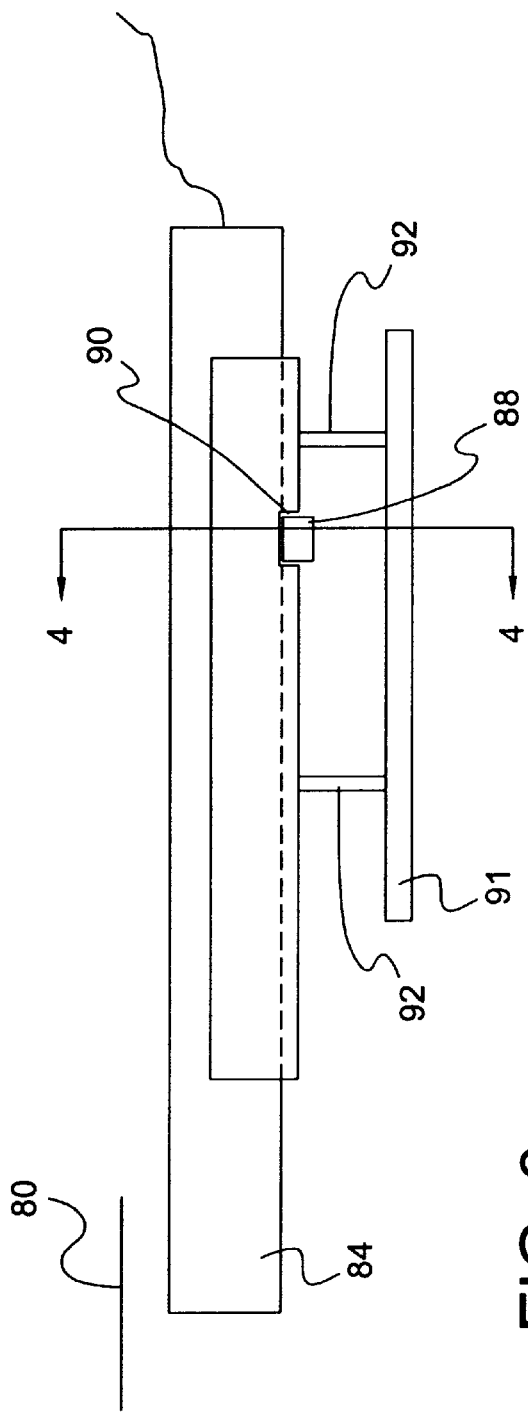
FIG. 3 is a side elevation of the probe in a position to measure the electrical potential of the web.
Figure 4:
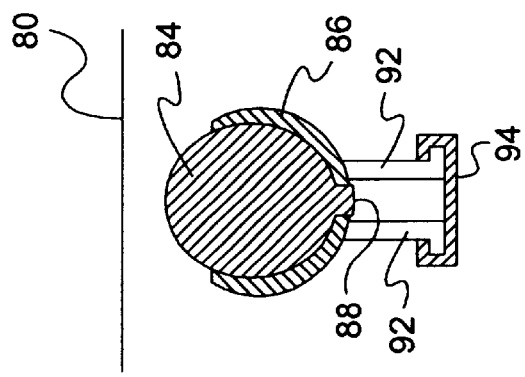
FIG. 4 is an end elevation of the probe taken across 4—4 of FIG. 3.

FIGS. 3 and 4 show the relationship of the probe 84 and a portion of the web 80 in greater detail. The probe 84 engages the bracket 86 and is maintained in a reproducible fiducial relationship therewith. Usually, the bracket 86 is made from a somewhat flexible plastic, and has a U-shaped profile which allows the probe 84 to be snapped into place. The reproducible relationship is normally provided by an aligning member 88 on the underside of the probe 84, and a corresponding recess 90 at the base of the bracket 86.

Figure 7:
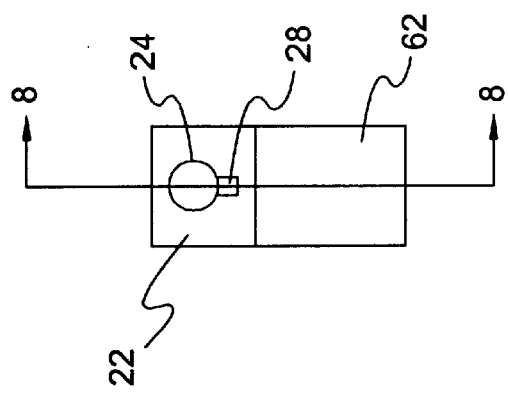
FIG. 7 is an end elevation of the device.
Figure 8:
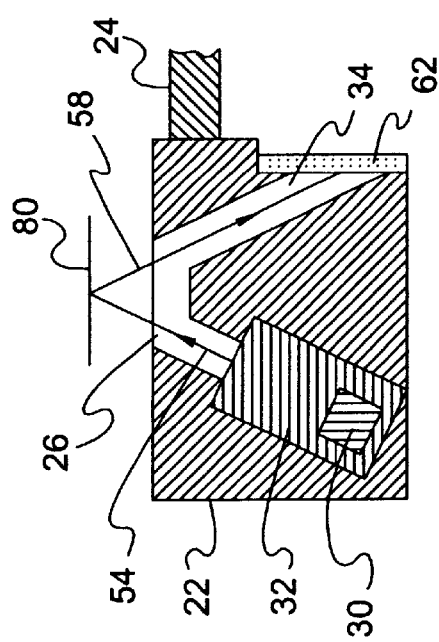
FIG. 8 is a cross-section of a portion of the device taken across 8—8 of FIG. 7.

FIGS. 5, 6, 7 and 8 schematically show the measuring device 20, with the rigid body 22 and a rigidly attached elongate cylindrical extension 24. The extension 24 simulates the geometry of the probe 84, and has an aligning pin 28 which matches the aligning member 88 of the probe 84. In particular, the cross-section of FIG. 8 shows the relationship between the device 20 and the web 80.

The body 22 incorporates the light source 52, preferably a coherent light source such as a low-intensity laser 32 which can project the collimated beam 54. Although less convenient, the collimated beam 54 could be produced in other ways, such as by a low-voltage incandescent bulb (LED or LCD) in conjunction with suitable optics. Power to the source 52 is typically provided by an internal battery 30. The body 22 includes a projection channel and a reflection channel optically intermediate the source 52 and the screen 62.

Figure 9:
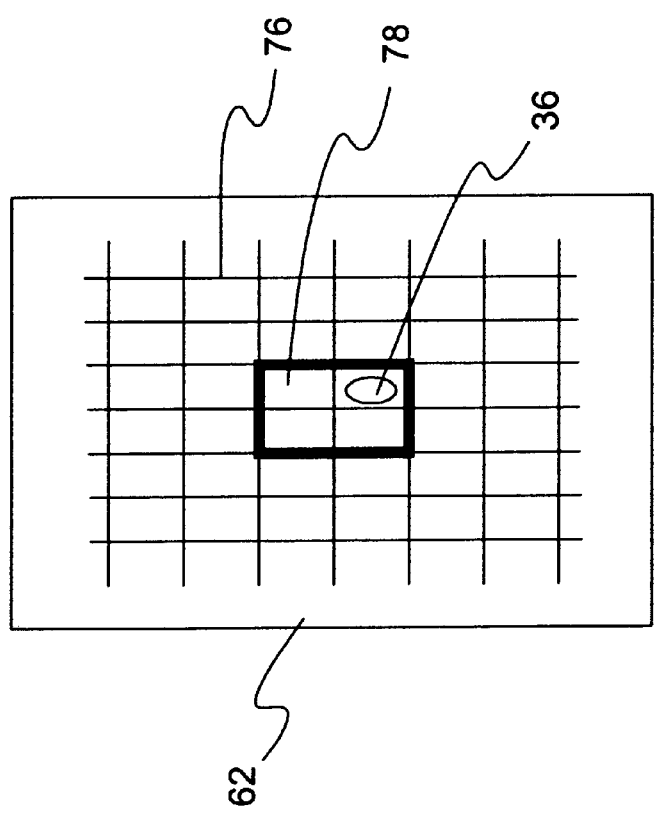
FIG. 9 shows a screen with grid lines.

When actuated, the projected beam 54 passes through the projection channel in the body 22, emerges from the body 22 at an opening 26 and is reflected at the web 80 target. The reflected beam 58 passes through the reflection channel, continuing unimpeded until it impinges on the screen 62 to create the light spot 36. As indicated in FIG. 9, the screen 62 typically has indicia such as a grid 76, which provides a reference for the position of the light spot 36. As indicated earlier, the position of the light spot 36 is determined by the relative positions of the web 80 and the device 20. For a correct adjustment, the light spot 36 lies within a predetermined limiting area 78 of the grid 76. Typically, any displacement outside the limiting area would have only a vertical component, and would represent a vertical displacement of the web 80 and the device 20 relative to each other. This would be corrected by adjusting the vertical position of the bracket 86. Occasionally, it may happen that the bracket 86 is skewed out of alignment, so that the plane containing the incident beam 54 and the reflected beam 58 is no longer vertical, and the displacement of the light spot 36 may therefore have a horizontal component.

It was assumed in the foregoing that the planes such as 64 and 66 which define the orientation of the target 56 are parallel. In the limited region of the flexible web 80 where the projected beam 54 is incident, this assumption normally provides a satisfactory approximation. However, this may not always be the case. Although usually precluded in the particular case of the electrophotographic marking machine 82, in more general cases the web 80 may be incorrectly tensioned, causing it to be skewed out of the expected plane. In such an eventuality, the displacement of the light spot 36 can also have a horizontal component.

Thus, the device 20 is capable of replacing the probe 84 in the bracket 86 when it is required to check, and if necessary adjust, the spacing between the probe 84 and the web 80. Since the relationship between the bracket 86 and either the probe 84 or the device 20 is fixed, the relationship between the web 80 and the device 20 is always predictive of the relationship between the web 80 and the probe 84, once the position of the web 80 is determined.

While the bracket 86 is normally fixed relative to the machine 82, it is nevertheless movably secured thereto to allow its translation to another position. This might be necessary, for example, if it were desired to optimize the location of the probe 84. To allow for such translation, support members 92 of the bracket 86 slidingly engage a rail 94 which is itself immovably secured to the machine 82. However, it is understood that once the probe location is established, and prior to any use of the device 20, the bracket 86 remains fixed in the rail 94, whereto it is secured by removable attachment members (not shown).

Figure 5:
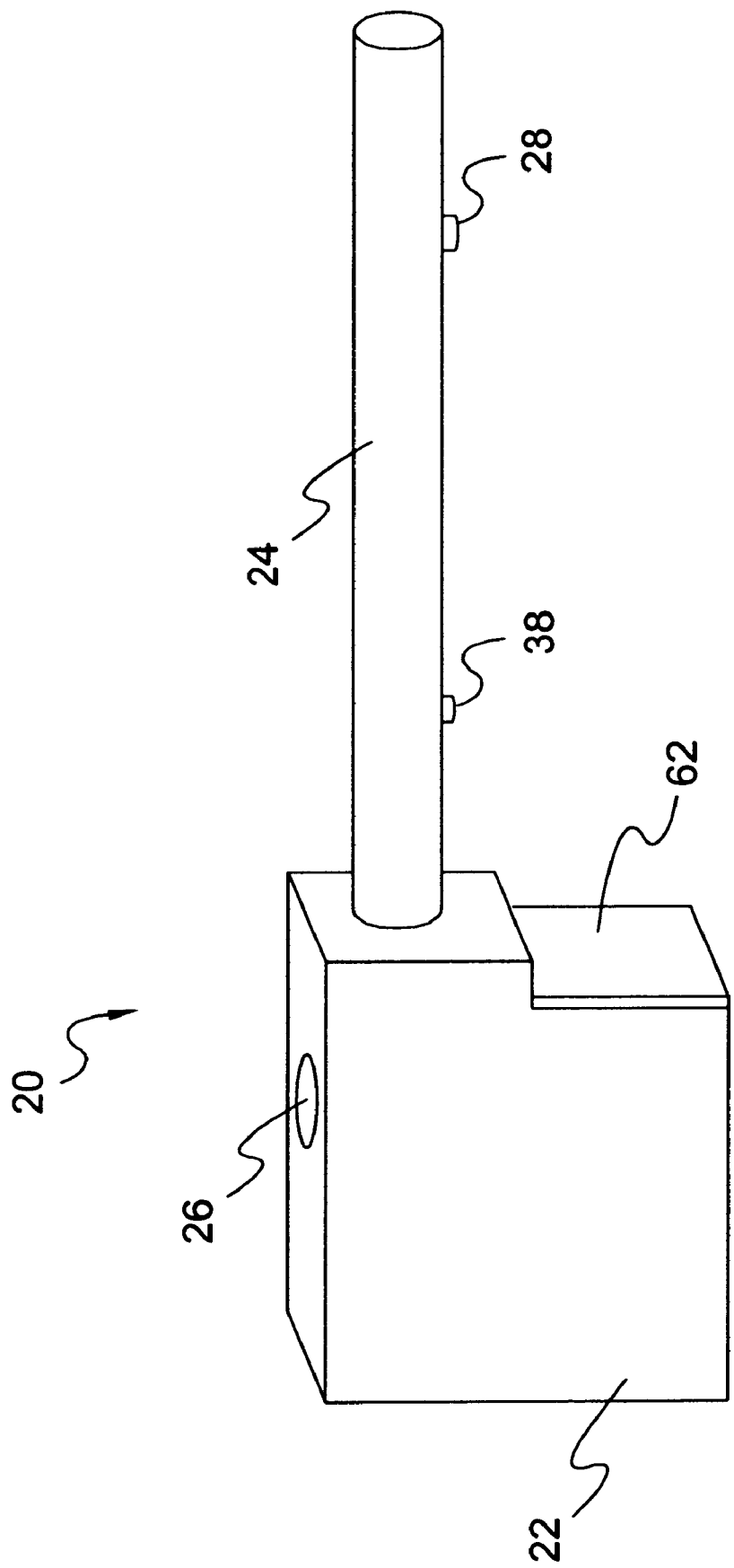
FIG. 5 is a perspective view of the distance measuring device.
Figure 6:
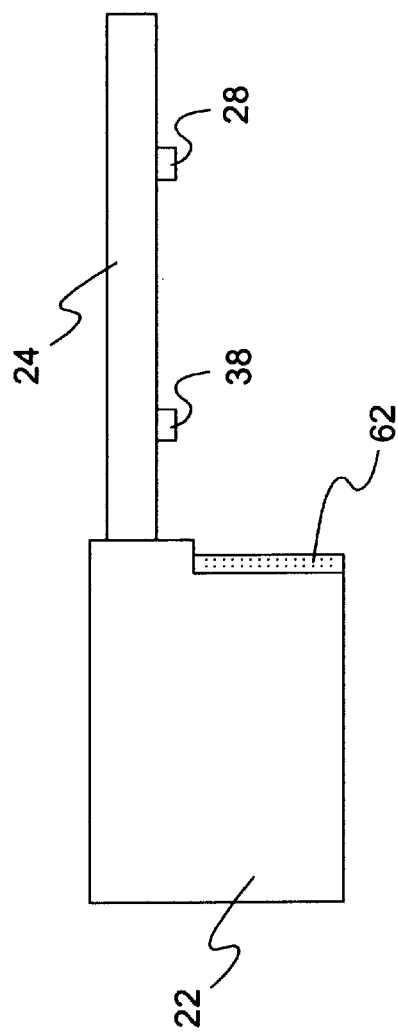
FIG. 6 is a side elevation of the distance measuring device.

The device optionally has an interlock switch or button 38, which is shown in FIGS. 5, 6 and 7. This is located on the extension 24, and has an electrical connection (not shown) with the source 52. The button is configured so that the source can only operate when the extension engages the bracket. The button can either be the sole on-off switch for the source, or it can enable a second on-off switch to be actuated when needed.

Figure 10:
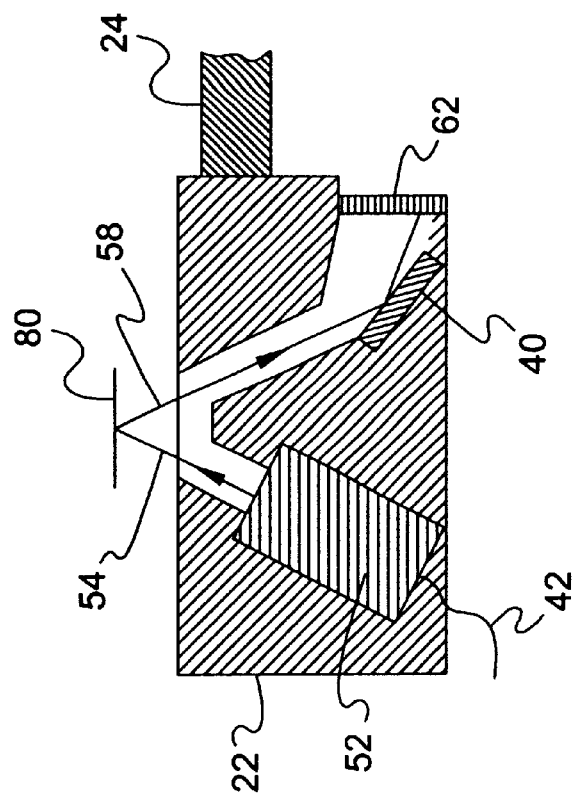
FIG. 10 is a cross-section equivalent to that of FIG. 8 of a second embodiment of the device.

In a second embodiment, shown in FIG. 10, the device has an internal mirror 40 in the reflection channel optically intermediate the web 80 and the screen 62. The mirror 40 is located to divert the reflected beam 58 onto the screen 62. This embodiment may sometimes be more convenient, or it may be necessary when restricted space or access to the target imposes constraints on the geometry of the device. Also shown in FIG. 10 is a power lead 42 connected to the source, as an alternative to the battery 30. Obviously, this option would be available for any embodiment of the device.

The device 20 is used as follows. When it is necessary to check and possibly adjust the separation of web 80 and the probe 84, the machine 82 is opened, the probe 84 is removed from the bracket 86 and the device 20 is engaged with the bracket 86, in correct registration therewith as is provided for by the aligning pin 28 and the recess 90. When the device 20 is actuated, the collimated source such as the laser 32 projects the beam 54 through the projection channel and onto the web 80. The reflected beam 58 from the web 80 passes through the reflection channel and mirror 40, if employed, to impinge on the screen 62, whereon it creates the light spot 36 which is conveniently viewed by a user. If the light spot 36 lies within the predetermined limiting area 78 of the grid 76, no adjustment is necessary. If not, the bracket 86 is adjusted until the light spot 36 is within the limiting area 78. The adjustment normally involves correcting the distance of the web 80 from the device 20, and therefore from the probe 84 which the device 20 temporarily replaces. If this distance is outside specifications, the light spot 36 is displaced vertically on the screen 62.

In the embodiments as illustrated, the screen 62 and the reflected beam 58 are non-perpendicular to each other.

However, a perpendicular orientation is not precluded, either when the reflected beam 58 impinges on the screen 62 directly or after being diverted by the mirror 40.

The device 20 has the advantages of being readily portable, robust, relatively inexpensive and easy to use. A person servicing an electrophotographic marking machine, or any other equipment in which has a critically positioned flexible surface which is moderately reflective, can carry the device as part of a tool kit or even in a shirt pocket, and use it maintenance or trouble-shooting. Its effectiveness is not at all affected by energy loss at the reflecting surface. It would only become ineffective if the reflective quality of the surface were so bad, or the surface were so covered by extraneous matter, that excessive scattering of light would vitiate the integrity of the reflected beam 58, thus preventing the light spot 36 from being clearly seen. In practice, such limitations would be totally unexpected during the normal use of the device.

The invention has been described in detail with particular reference to certain preferred embodiments thereof, but it will be understood that variations and modifications can be effected within the spirit and scope of the appended claims.

I claim:

1. In an electrophotographic marking machine having a translatable web, a device for indicating a position of the web relative to a removable probe releasably engaged by a bracket, the device comprising:

(a) a rigid body configured to engage the bracket;

(b) a collimated light source connected to the body and configured to project a beam onto the translatable web to form a reflected beam; and (c) a screen connected to the body and located to intercept the reflected beam.

2. The device of claim 1, wherein the body includes an elongated cylindrical extension.

3. The device of claim 1, wherein the bracket has a recess, and each of the probe and the device has a corresponding aligning element for engaging the recess.

4. The device of claim 1, wherein the body includes a reflection channel through which the reflected beam passes.

5. The device of claim 4, further comprising a mirror located to reflect the reflected beam to the screen.

6. The device of claim 1, wherein the light source is a coherent light source.

7. The device of claim 1, wherein the beam is visible.

8. The device of claim 1, wherein the body includes a projection channel through which the beam passes.

9. The device of claim 1, wherein the source and the screen are selected to produce a visible indicator on the screen corresponding to interception of the reflected beam.

10. The device of claim 1, wherein interception of the reflected beam on the screen corresponds to the position of the web.

11. The device of claim 1, wherein the screen includes indicia.

12. The device of claim 11, wherein the indicia includes a grid.

13. The device of claim 1, wherein the screen is non-perpendicular to the reflected beam.

14. The device of claim 1, wherein the screen is perpendicular to the reflected beam.

15. The device of claim 1, further comprising an interlock switch to permit operation of the source only upon engagement of the body with the bracket.

16. A device for non-contactingly indicating a position of a translating web in an electrophotographic marking engine, comprising:

(a) a rigid body configured to be releasably located relative to the electrophotographic marking engine;

(b) a collimated light source connected to the probe body and aligned to project a beam onto the translating web to produce a reflected beam; and (c) an indicating member connected to the body and located to intersect the reflected beam.

17. A method for non-contactingly indicating a relative distance in an electrophotographic marking machine between a probe releasably engaged to a bracket and a translatable web, using a device which can removably engage the bracket, the device having a light source and a screen; the method including the steps of:

(a) removing the probe from the bracket;

(b) engaging the device with the bracket;

(c) actuating the light source to project a collimated beam onto the web to form a reflected beam; and (d) impinging the reflected beam on the screen.

18. The method of claim 17, comprising the further step of adjusting the bracket in response the reflected beam impinging the screen.

* * * * *